(12) United States Patent
Zsohar et al.

(10) Patent No.: US 10,965,600 B2
(45) Date of Patent: *Mar. 30, 2021

(54) METADATA EXTRACTION (71) Applicant: Trend Micro Incorporated, Tokyo (JP)

(72) Inventors: Leslie Zsohar, Austin, TX (US); Wei Lu, Austin, TX (US); Randal Mullin, Austin, TX (US); Craig Botkin, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/861,509

(22) Filed: Apr. 29, 2020

(65) Prior Publication Data

US 2020/0259751 A1    Aug. 13, 2020

Related U.S. Application Data

(63) Continuation of application No. 16/000,367, filed on Jun. 5, 2018, now Pat. No. 10,680,959, which is a
(Continued)

(51) Int. Cl.
*H04L 12/815* (2013.01)
*H04L 29/06* (2006.01)
(Continued)

(52) U.S. Cl.
CPC .............. *H04L 47/22* (2013.01); *H04L 43/04* (2013.01); *H04L 43/12* (2013.01); *H04L 47/20* (2013.01);
(Continued)

(58) Field of Classification Search
CPC ....... H04L 43/028; H04L 43/04; H04L 43/12; H04L 47/20; H04L 47/22; H04L 47/2483;
(Continued)

(56) References Cited

U.S. PATENT DOCUMENTS 6,952,425 B1 * 10/2005 Nelson .................. H04L 67/327
370/407
7,627,669 B2 * 12/2009 Dugatkin ................ H04L 43/12
709/224

(Continued)

*Primary Examiner* — Thomas J Dailey
(74) *Attorney, Agent, or Firm* — Okamoto & Benedicto LLP (57) ABSTRACT

Examples of implementations relate to metadata extraction. For example, a system of privacy preservation comprises a physical processor that executes machine-readable instructions that cause the system to normalize a network traffic payload with a hardware-based normalization engine controlled by a microcode program; parse the normalized network traffic payload, as the network traffic payload passes through a network, by performing a parsing operation of a portion of the normalized network traffic payload with a hardware-based function engine of a plurality of parallel-distributed hardware-based function engines controlled by the microcode program; and provide the hardware-based function engine with a different portion of the normalized network traffic payload responsive to an indication, communicated through a common status interface, that the different portion of the normalized network traffic payload is needed to complete the parsing operation.

18 Claims, 3 Drawing Sheets

Related U.S. Application Data continuation of application No. PCT/US2016/012459, filed on Jan. 7, 2016.

(51) Int. Cl.
 H04L 12/26 (2006.01)
 H04L 12/813 (2013.01)
 H04L 12/851 (2013.01)

(52) U.S. Cl.
 CPC ...... H04L 47/2483 (2013.01); H04L 63/0245 (2013.01); H04L 63/1416 (2013.01); H04L 63/1425 (2013.01); H04L 63/168 (2013.01); H04L 43/028 (2013.01)

(58) Field of Classification Search
 CPC ............. H04L 63/0245; H04L 63/1416; H04L 63/1425; H04L 63/168
 See application file for complete search history.

(56) References Cited

U.S. PATENT DOCUMENTS

| | | | | |
|---|---|---|---|---|
| 7,840,664 | B2* | 11/2010 | Dugatkin | H04L 41/00 709/224 |
| 9,245,147 | B1* | 1/2016 | Williams | G06F 21/55 |
| 2006/0156404 | A1* | 7/2006 | Day | H04L 63/1408 726/23 |
| 2012/0182891 | A1* | 7/2012 | Lee | H04L 43/04 370/252 |
| 2012/0239652 | A1* | 9/2012 | Wood | H04L 69/22 707/737 |
| 2014/0269299 | A1* | 9/2014 | Koornstra | H04L 63/1416 370/235 |
| 2014/0297572 | A1* | 10/2014 | Zambon | H04L 43/18 706/12 |

* cited by examiner

METADATA EXTRACTION

CROSS-REFERENCE TO RELATED APPLICATION

This application is a continuation of U.S. patent application Ser. No. 16/000,367, filed on Jun. 5, 2018, which is a continuation of International Application No. PCT/US2016/012459, with an International Filing Date of Jan. 7, 2016. The contents of the just-mentioned related applications are incorporated herein by reference in their entirety.

BACKGROUND

Network communications between computing devices may be carried out by transmitting network packets from one device to another. For example, network packets may be transmitted utilizing a packet-switched network. Many different types of network packets having a variety of characteristics may be transmitted between computing devices. Network administrators may monitor various aspects of network traffic going into and out of their respectively managed networks. For example, a network administrator may analyze network traffic for problems or anomalies, such as malfunctioning devices, misconfigured devices, or malicious actors.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

An increasing volume of IP based traffic traversing networks increases the volume of analysis of the traffic. The analysis of the network traffic, such as for big data analytics and network forensics, may demand timely analysis of the network traffic data for rapid, complete, and accurate conclusions regarding data characteristics.

Analysis of network traffic may include dividing processing of a whole network packet into three steps. For example, a first step may include utilizing some dedicated devices to collect raw IP traffic. In this example, the collected raw IP traffic may be in the form of packet capture (pcap). A second step may include utilizing other computing devices to sort raw traffic into network flows based on parameters presented at different layers of protocols such as a link layer, IP layer, transport layer and application layer. The software tools used by the computing devices may be packet analyzers. A third step may include utilizing layered protocol information along with each network flow's time information to associate with logs and events collected from different computing systems.

Steps one and two, as described above, may be expensive in terms of storage and other computational resources. Further, the results from step three may be inaccurate and may frequently be late in terms of taking actions associated with the data. In an attempt to address these deficiencies, step one and two may be performed in tandem to reduce the time delay between step one and step three. However, these attempts do not address the significant storage and computational resource consumption associated with these steps.

In contrast, examples of the present disclosure include hardware-based examples for programmable and substantially real time data extraction from and operation upon IP network traffic. Examples include a method of metadata extraction including normalizing a network traffic payload with a hardware-based normalization engine controlled by a microcode program and performing a plurality of parsing operations on the normalized network traffic payload utilizing a respective plurality of parallel-distributed hardware-based function engines controlled by the microcode program. The examples may also include communicating a status of each of the plurality of parsing operations to the normalization engine and the plurality of function engines through a common status interface and organizing a plurality of outputs captured from the plurality of parallel-distributed hardware-based function engines into a stream of captured metadata.

Figure 1:
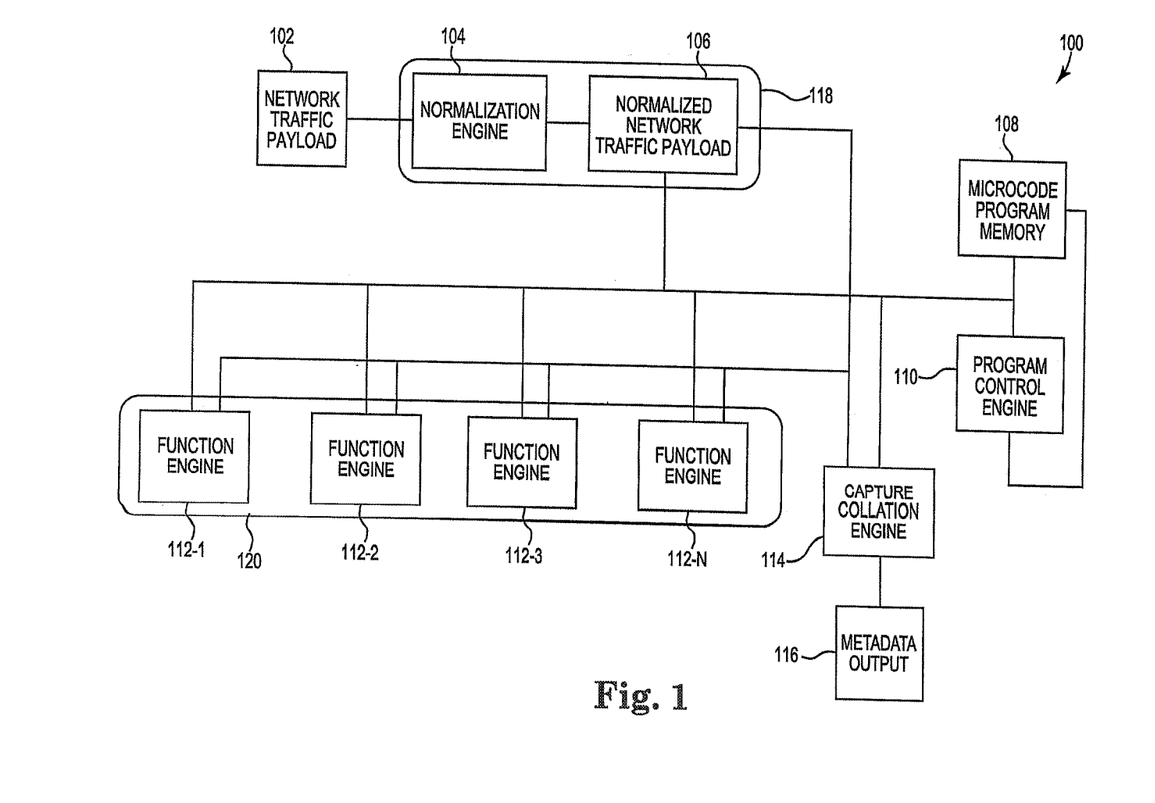
FIG. 1 is an example of an environment in which metadata extraction may be implemented.

FIG. 1 is an example of an environment 100 in which various examples may be implemented. The environment 100 may be entirely or partially within one or more networks. The network may be a network providing communication between computing devices. The computing devices on the network may utilize the same communication protocol. For example, the network may be an IP-based network and the computing devices may utilize IP for their communication protocol. The IP may be responsible for addressing hosts and for routing packets from a source host to a destination host across one or more IP networks. For example, the IP may deliver packets from a source host to a destination host across the network based on IP addresses in packet headers. The IP traffic may include packet structures that encapsulate the data to be delivered.

A variety of internet protocol (IP) based network traffic may flow between computing devices operating on a packet-switched network. IP traffic may include a network traffic payload 102. As used herein, a network traffic payload 102 may refer to the data cargo of a unit of network transmission such as a packet. The network packet payload 102 may include data cargo of a network packet as it passes through the network and its associated hardware including the components illustrated in the environment 100.

An amount or portion of data of the network traffic payload 102 subject to the analysis and operations of the components of the environment 100 may influence the speed at which the network traffic payload 102 may be analyzed and operated. For example, the less data of the network traffic payload 102 that is subject to analysis and operations, the faster the network traffic payload 102 may be analyzed and processed.

The network traffic payload 102 may include data corresponding to particular layers associated with the network traffic. In some examples, the data of the network traffic payload 102 that is meaningful (e.g., a particular type of data that has been identified for a particular type of analysis, a particular type of data identified as meaningful by a network administrator, a particular type of data associated with analytics or security functions applicable to the network, etc.) is buried within a network packet at particular layer protocols. As used herein, a layer may refer to a specified portion of a layered system such as an open system interconnection model (OSI model). That is, a layer may refer to a partitioned abstraction layer of a system. A layer may be a layer that serves the layer above it and is served by the layer below it in the system model. As used herein, the layer may include specific units of data specified in a protocol defining types of data units associated with a given layer. Where the layer described is a layer of an OSI model, the layer may be any one of seven layers associated with the model. For example, the layer may be a layer one physical layer (protocol data unit is the bit or, more generally, symbol), a layer two data link layer (protocol data unit is the frame), a layer three network layer (protocol data unit is the packet), and/or a layer four transport layer (protocol data unit is the segment for transmission control protocol or the datagram for user datagram protocol). Additionally or alternatively, the layer may be a layer five session layer, layer six presentation layer, or layer seven application layer (protocol data unit is the data, which can be clear text, encrypted, or compressed).

The meaningful data of the network traffic payload 102 may, for example, be buried deep within a network packet. For example, the meaningful or targeted data of the network traffic payload may be present in layer five (L5) or higher protocols of the network packet. For data analytics and security function purposes it may be desired to perform substantially real time and detailed analysis of the L5 protocols at multi-Gigabit speeds along with having the ability to detect and extract only the data that is deemed meaningful by a user, including L5 header information and attachments. Further, headers and attachments of the network traffic payload 102 may be encapsulated within different encapsulation methods such as multipurpose internet mail extensions (MIME) or chunking. The examples described herein allow a user to dynamically modify a definition of meaningful data to be extracted based on their immediate needs and regardless of encapsulation method at multi-Gigabit speeds.

In analyzing a network traffic payload 102 for the purposes of security events, incident management, big data analytics, malware analysis, and network forensics, layer five and higher layer payloads (e.g., layer six presentation layer, layer seven application layer) may be layers where meaningful data is contained within the network traffic payload 102. To increase the speed of analysis of and operation on the network traffic payload 102 the network traffic payload 102 may include exclusively the layer five and/or higher layer portions of the network traffic. For example, layer five and higher layer payloads may be extracted from or otherwise separated from the lower level portions of the network traffic in substantially real time as the network traffic passes through the network. A network traffic payload 102 of level five and above may streamline the analysis of and operations on the network traffic payload 102 as compared to a more comprehensive or inclusive network traffic payload 102. A focused and selective partitioning of the network traffic data payload 102 into layer five and above may allow for rapid programmable analysis and extraction of metadata from deep within layer five and higher layers of the network traffic.

The environment 100 may include a number of stages of a system of metadata and attachment extraction. For example, the network traffic payload data 102 may enter the first stage 118 of a two-stage (e.g., first stage 118 and second stage 120) metadata and attachment extraction system. The first stage may be a normalization stage. In an example, the layer five or higher payload data of the network traffic payload 102 may enter, via a first in, first out method, the first stage 118 of data normalization. The first stage of data normalization may include a substantially real time storage of network traffic payload 102 data that may be utilized for smoothing of individual lines of the data into various hardware-based processing engines. The hardware-based processing engines may include the normalization engine 104, the function engines 112-1 . . . 112-N, the program control engine 110, and the capture collation engine 114.

The hardware-based processing engines may analyze, operate on, and/or extract data from the network traffic payload 102 as the network traffic passes through the network. The hardware-based processing engines may be presented in a variety of physical appliances located throughout the network through which packets pass during their communication from a source host to a destination host. For example, the hardware-based engines may be included in a network device such as a standalone network device, a network switch, a router, or any other device through which network packets flow in a packet-switched network.

As used herein, a hardware-based processing engine may include one or more electronic circuits that include electronic components for performing actions, such as those described with respect to stage one 118 and stage two 120 of the environment 100. The hardware-based processing engine may include a programmable hardware processor such as, for example, a field programmable gate array (FPGA), an application-specific integrated circuit (ASIC), an application-specific instruction set processor (ASIP), a complex programmable logic device (CPLD), to name a few. In some implementations, multiple hardware-based processing engines (e.g., normalization engine 104, function engines 112-1 . . . 112-N, capture collation engine 114, etc.), of the same type or combination of types, may be used, e.g., to perform actions.

A hardware-based processing engine may include an FPGA, included in a network appliance, configured to process all the network traffic that flows through it. For example, a hardware-based processing engine may include an FPGA-programmable hardware utilized to analyze, capture, store, organize, and filter network traffic and the data included in network packets (e.g., network traffic payload 102) as the traffic flows through a network. In particular, a hardware-based processing engine may include an FPGA that may extract and/or store particular data of interest (e.g., meaningful data) for later analysis.

The first stage 118 of the two-stage system of metadata and attachment extraction may include parallelizing the network traffic payload data 102 into an applicable width line (e.g., bus). For example, the network traffic payload data 102 may be parallelized into an eight byte bus line, a sixteen byte bus line, a thirty-two byte bus line, etc. In some examples, the clock rates for these payload lines may be approximately one hundred and fifty megahertz to three hundred megahertz. These example speeds may allow for several tens of gigabits of data processing per second. In some examples, the network traffic payload data 102 may be processed at a rate of one clock per instruction per payload line.

The first stage 118 may include passing the network traffic payload 102 through zero, one, or a plurality of hardware-based normalization engines. The plurality of hardware-based normalized engines may include normalization engine 104. Each of the hardware-based normalization engines may include a hardware-based processing engine to perform a specific and/or unique function on the network traffic payload 102. For example, normalization engine 104 may include a hardware-based processing engine to perform de-chunking of the network traffic payload 102. De-chunking the network traffic payload 102 may include removing the chunk headers and subsequently concatenating the meaningful data of hypertext transfer protocol (HTTP) and simple mail transfer protocol (SMTP) payloads, as defined in the various HTTP and SMTP request for comments (RFC) standards, from the network traffic payload 102 as the network traffic payload 102 passes through the normalization engine 104. De-chunking may allow function engines 112-1 . . . 112-N to parse the HTTP and SMTP protocols without being affected by the chunking option of the protocols. The normalization engine 104 may include a hardware-based processing engine to perform a white space normalization to the network traffic payload 102. White space normalization may include removing and/or homogenizing white space present in the network traffic payload 102 as the network traffic payload 102 passes through the normalization engine 104. The normalization engine 104 may yield a normalized network traffic payload 106. A normalized network traffic payload 106 may include the resulting payload from the normalization function performed on the network traffic payload 102. For example, the normalized network traffic payload 106 may include the de-chunked network traffic payload 102 and/or the network traffic payload 102 with the white spaced removed.

As with each of each of the hardware-based processing engines described herein, each of the hardware-based normalization engines may function as a modular building block that may be plugged into and/or removed from the two-stage (e.g., first stage 118 and second stage 120) system of metadata and attachment extraction. Due to the modular nature of the hardware-based processing engines and iterations thereof, each having specific functional capabilities, a modular and highly adaptable system of metadata and attachment extraction is achieved.

The individual building modular building block-like hardware-based processing engines may be controlled by a microcode program that is loadable and modifiable.

As used herein, microcode may include a layer of hardware-level instructions that implement higher-level machine code instructions or internal state machine sequencing in a plurality of digital processing elements such as the various hardware-based engines described herein. The microcode may include a concatenation of disparate portions of instructional information to operate each specific hardware-based engine. Each subsequent line of microcode may invoke either the same or a different specific hardware-based engine. The microcode may reside in high-speed memory such as the microcode program memory 108. The microcode may translate machine instructions, state machine data or other input into sequences of detailed circuit-level operations. The microcode may control a processing unit at a very fundamental level of hardware circuitry.

A program control engine 110 may control the addressing of the microcode program memory 108. The program control engine 110 may implement sequential processing or jumps between implementation of various hardware-based engines based on the microcode and/or based on a shared status communicated from and between the normalization engine and/or the various function engines 112-1 . . . 112-N.

The second stage 120 of the two-stage system of metadata and attachment extraction may include a number of function engines 112-1 . . . 112-N to operate on the network traffic payload 102 or the normalized network traffic payload 106 resulting from the normalization of the network traffic payload 102. While described herein as a first stage 118 and a second stage 120, the first stage 118 and second stage 120 do not have to be performed in any particular order or even both be performed to perform the system of metadata and attachment extraction. The function engines 112-1 . . . 112-N may include an overall parser functionality operable on the network traffic payload 102 or the normalized network traffic payload 106. The function engines 112-1 . . . 112-N may each perform a specific and targeted operation on the network traffic payload 102 or the normalized network traffic payload 106. For example, a plurality of function engines 112-1 . . . 112-N may each perform a distinct parsing operation of a plurality of parsing operations.

The function engine 112-1 may include a string search engine 112-1. A string search engine 112-1 may include a hardware-based processing engine to perform a simultaneous search on a plurality of strings of data of the normalized network traffic payload 106. For example, a string search engine 112-1 may include a hardware-based processing engine to perform a simultaneous search on up to four strings of data of the normalized network traffic payload 106. The string search engine 112-1 may search all byte boundaries within a line of data simultaneously. Each line of data may take one clock cycle for all the searches to occur. The search may be instructed to complete either when one of the targeted strings (e.g., meaningful data) is found or when none of the targeted strings is found. Normalized network traffic payload 106 may be instructed through microcode to be either captured or discarded as the search progresses.

The function engine 112-2 may include a count function engine 112-2. A count function engine 112-2 may include a hardware-based processing engine to either discard or capture a particular number of bytes depending on instructions from the microcode. The count function engine 112-2 may determine the particular number of bytes from the microcode or from the registers of the other engines (e.g., normalization engine 104, function engines 112-1 . . . 112-N, capture collation engine 114, etc.).

The function engine 112-3 may include an arithmetic function engine 112-3. An arithmetic function engine 112-3 may include a hardware-based processing engine to load a number of registers from microcode or from normalized network traffic payload 106 data. The arithmetic function engine 112-3 may perform or allow arithmetic operations among registers and may perform or allow comparisons among engines.

The function engine 112-N may include an MIME delimiter function engine 112-N. The MIME delimiter function engine 112-N may include a hardware-based processing engine to capture into registers a MIME delimiter that has been located through the overall operation of parsing of the normalized network traffic payload 106 by the function engines 112-1 . . . 112-N. The MIME delimiter function engine 112-N may be designed to exclusively and rapidly perform the MIME delimiter capture function and to monitor MIME nesting. For example, the MIME delimiter function engine 112-N may monitor three levels of MIME, each level with its own MIME delimiter.

The specific example normalization engines and function engines described herein are provided as non-limiting examples of hardware-based engines that may be utilized in the normalization and/or parsing in a system of metadata and attachment extraction. All, some, or none of the specific engines described herein may be utilized in a given iteration of the system of metadata and attachment extraction. Other examples of normalization engines 104 and function engines 112-1 . . . 112-N that can be utilized in the system of metadata and attachment extraction may include hardware-based engines that may normalize, decode, and/or otherwise operate on a portion of the network traffic payload 102 and/or normalized network traffic payload 106 with a variety of formats. For example, the normalization engines 104 and function engines 112-1 . . . 112-N may operate on a portion of the network traffic payload 102 and/or normalized network traffic payload 106 having a .ZIP format, a DEFLATE format, a Base64 format, etc.

All of the engines (e.g., normalization engine 104, function engines 112-1 . . . 112-N, capture collation engine 114, program control engine 110, etc.) of the environment may be in communication with each other. For example, each of the engines may have access to a shared status interface, a shared payload interface, and a shared microcode interface common among all the engines. Near instantaneous and substantially real time status information regarding an active hardware-based engine may be shared utilizing the shared interfaces for communication. The status information may be shared as an active hardware-based engine performs its operation on a network traffic payload 102 and/or normalized network traffic payload 106. The hardware-based engines and the microcode may be made, simultaneously and in substantially real time, aware of the status of a payload operation occurring in the environment 100. This shared communication among the hardware-based engines may allow for the orchestration of dynamic complex parsing functions by seamlessly coordinating the transition between unique modular building block hardware-based engines in substantially real time and at multi-gigabit speeds.

For example, the shared communication and modular building block nature of the hardware-based engines may allow a user to rapidly modify a definition of meaningful data and adapt a system of metadata and attachment extraction to analyze, identify, and extract the meaningful data by modifying the hardware-based engines utilized in the operations without altering the operation or function of the microcode and of any existing and/or remaining hardware-based engines in the system of metadata and attachment extraction. In an example, a hardware-based engine may be inserted and/or removed based on a parameter of the overall parser functionality specified by a user. Adding and/or removing, for example, a function engine 112-1 . . . 112-N may be performed without affecting the microcode or any of the function engines 112-1 . . . 112-N remaining in the system of metadata and attachment extraction. A modified and/or remaining function engines 112-1 . . . 112-N may continue to utilize the shared communication interfaces to influence its operations rather than relying on a particular other function engines 112-1 . . . 112-N or a modification of microcode to alter its operations. As described above, the switching between the modular building block hardware-based engines, also known as "jumps" may be implemented by the program control engine 110 based on the microcode and the commonly shared status from the various hardware-based engines. A present status of an overall parsing operation may dictate that a next sequential code is not the appropriate code to run. A present status may indicate that another piece of code that is elsewhere in the program is the correct code to be run. Therefore, a "jump" may include a switch to that piece of code identified as the correct code to run. In some examples, the "jump" to a new piece of code may or may not result in a switch between the modular building block hardware-based engines.

The function engines 112-1 . . . 112-N may include a plurality of parallel-distributed hardware-based function engines 112-1 . . . 112-N. Performing a plurality of parsing operations on, for example, the normalized network traffic payload 106 may include sequentially performing the plurality of parsing operations by switching among the respective plurality of parallel-distributed hardware-based function engines 112-1 . . . 112-N according to a sequence of a microcode. Performing the plurality of parsing operations on the normalized network traffic payload 106 may include, where possible and practical, operating any function engine 112-1 . . . 112-N and/or normalization engine 104 concurrently in parallel. The structure of the microcode may permit this flexibility by sequentially and/or concurrently operating any function engine 112-1 . . . 112-N and/or normalization engine 104. For example, the microcode may have a structure such that each subsequent line of the microcode may invoke either the same or a different function engine 112-1 . . . 112-N and/or normalization engine 104. This structure may allow for a mix-and-match approach to invocation of function engine 112-1 . . . 112-N and/or normalization engine 104 components. The ability to mix-and-match may allow for a substantially real time creation of diverse iterations of a system of metadata and attachment extraction.

Further, a hardware-based engine may utilize the shared status interface to control whether multiple clock cycles are associated with completing a corresponding operation and/or whether additional lines of network traffic payload 102 data and/or normalized network traffic payload 106 data are needed to complete the corresponding operation. Each hardware-based engine may also generate and communicate a flag as part of its shared status communicated through the shared status interface. The flag may serve as an indication to the program control engine 110 as to the appropriate switches and/or switch timing to execute between the hardware-based engines.

Any of a number of the stages of the system of metadata and attachment extraction, such as the first stage 118 and the second stage 120 of the example environment 100 may include functional slices of a particular overall function spread across the number of hardware-based engines For example, a first stage 118 may include a normalization stage associated with normalizing the network traffic payload 102 as described above. The normalization stage (e.g., first stage 118) may include normalization engines (e.g., a de-chunking engine, white space normalization engine, etc.). In such an example, the normalization stage may have an overall function of normalizing a network traffic payload 102, and that overall function may be split among functional slices such as de-chunking the network traffic payload 102 and performing a white space normalization to the network traffic payload 102, which may be performed by the de-chunking engine and white space normalization engine, respectively.

A second stage 120 may include a stage associated with a parsing operation. The second stage 120 may be associated with parsing a normalized network traffic payload 106 as described above. Again, the first stage 118 and the second stage 120 do not have to be performed in any particular order and do not have to both be performed in order to perform the system of metadata and attachment extraction. Further, the first stage 118 and the second stage 120 are not restricted to each performing a non-intersecting set of operations. In other words, the second stage 120 may assist the first stage 118 in normalizing the network traffic payload 102. As an example, the second stage 120 may assist the first stage 118 in de-chunking normalizing the network traffic payload 102. In such an example, the network traffic payload 102 may actually traverse second stage 120 twice, the first time to assist in normalizing the data and the second time to actually parse the normalized network traffic payload 106.

The parsing operation stage (e.g., second stage 120) may include function engines (e.g., string search engine, arithmetic function engine, count function engine, MIME delimiter function engine, etc.). In such an example, the parsing operation stage may have an overall function of parsing the normalized network traffic payload 106. The overall parsing function may be split among functional slices such as a string search function, arithmetic function, count function, and a MIME delimiter function, which may be performed by the string search engine, arithmetic function engine, count function engine, and a MIME delimiter function engine, respectively.

The environment 100 may also include a capture collation engine 114. A capture collation engine 114 may include a hardware-based engine. The capture collation engine 114 may accept captured outputs from the various hardware-based engines (in communication with the capture collation engine 114. The capture collation engine 114 may generate a metadata output 116 from the captured data. The metadata output 116 may include a stream of captured metadata and/or attachment data organized by the capture collation engine 114 from the captured outputs. The metadata output 116 may be formatted for later analysis and/or presentation to a user.

The capture collation engine 114 may accept meaningful data under microcode control. The meaningful data may be limited to including the metadata and attachment data that meet an attribute identified as meaningful by a user. Therefore, the metadata output 116 may be limited to the same meaningful data. Since the metadata output 116 is limited to meaningful data, the overall amount of data to be stored, analyzed, etc. may be reduced as compared to less targeted data collections and analysis methods. With less data to be considered, an analyst and/or analytics software may draw timely and complete conclusions based on the data more rapidly than when utilizing the less targeted collection methods involving more of a network packet. With less data processing times are naturally reduced. Therefore, an analyst or analytics software may identify a different type of metadata and/or attached file as potentially meaningful more rapidly than when utilizing the less targeted collection methods involving more of a network packet. Furthermore, the modifiable nature of system of metadata and/or attachment extraction described herein may allow a rapid adaptation to analyze, extract, collect, etc., the newly identified metadata and/or attachments without significant reconfigurations of hardware and/or programming.

Utilizing the loadable and modifiable microcode control backbone with the modular block hardware-based capture engines allows for flexibility in making rapid substantially real time decisions to capture different types of metadata and/or attachments (e.g., as meaningful data) based on various attributes of the various protocols being normalized and/or parsed. Since the system of metadata and attachment extraction can be programmable using microcode, a modification to a metadata and attachment extraction system may be accomplished without reloading a hardware-based engine such as an FPGA. Further, a mix and match modification of hardware-based engines may be accomplished without affecting the operation of existing and/or unmodified hardware-based engines of the metadata and/or attachment extraction system and/or affecting the microcode. In further examples, the addition and removal of different hardware-based engines may be accomplished through FPGA reloads done remotely while the system is in service. The above-described system of metadata and/or attachment extraction may be scalable into increasingly complex and faster protocol processing.

The system, machine readable medium (MRM), and method described herein may be practiced in and/or utilize the components of the environment 100.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening element, unless otherwise indicated. Two elements can be coupled mechanically, electrically, or communicatively linked through a communication channel, pathway, network, or system. It will also be understood that, although the terms first, second, third, etc. may be used herein to describe various elements, these elements should not be limited by these terms, as these terms are only used to distinguish one element from another unless stated other or the context indicates otherwise. As used herein, the term "includes" means includes but not limited to, and the term "including" means including but not limited to. The term "based on" means based at least in part on.

Figure 2:
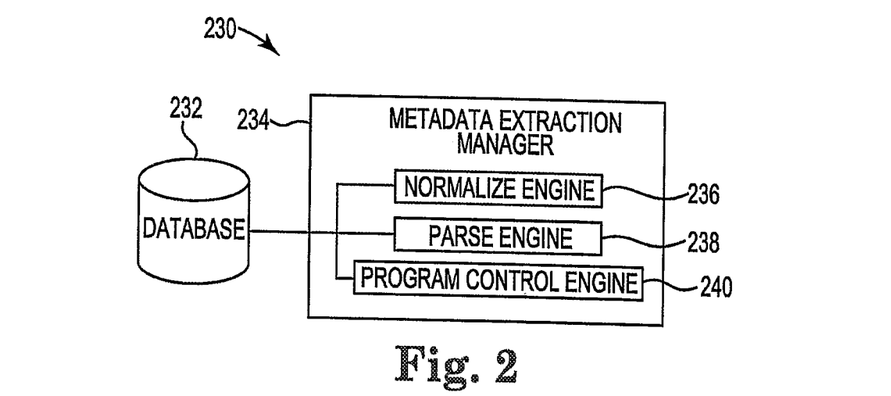
FIG. 2 is a diagram of an example of a system of metadata extraction.

FIG. 2 illustrates a diagram of an example system 230 of metadata extraction. The system 230 may include the system of metadata and/or attachment extraction discussed in relation to the environment 100 of FIG. 1. The system 230 may include a database 232, a metadata extraction manager 234, and/or an engine and/or a plurality of engines (e.g., normalize engine 236, parse engine 238, program control engine 240, etc.). The metadata extraction manager 234 may include additional or fewer engines than are illustrated to perform the various functions as will be described in further detail.

An engine or a plurality of engines (e.g., normalize engine 236, parse engine 238, program control engine 240, etc.) may include a combination of hardware and programming (e.g., instructions executable by the hardware), but at least hardware, that is configured to perform functions described herein (e.g., normalize a network traffic payload with a hardware-based normalization engine controlled by a microcode program; parse the normalized network traffic payload, as the network traffic payload passes through a network, by performing a parsing operation of a portion of the normalized network traffic payload with a hardware-based function engine of a plurality of parallel-distributed hardware-based function engines controlled by the microcode program; provide the hardware-based function engine with a different portion of the normalized network traffic payload responsive to an indication, communicated through a common status interface, that the different portion of the normalized network traffic payload is needed to complete the parsing operation, etc.). The programming may include program instructions (e.g., software, firmware, microcode, etc.)

stored in a memory resource (e.g., MRM, etc.) as well as hard-wired program (e.g., logic).

The normalize engine 236 may include hardware and/or a combination of hardware and programming, but at least hardware to normalize a network traffic payload. Normalizing a network traffic payload may include performing normalizing operations upon a data payload of a network packet such as de-chunking and/or white space normalization. Normalizing a network traffic payload may include distributing normalizing operations and/or portions of a normalizing operation among at least one hardware-based normalization engine. The hardware-based normalization engine may be controlled by a portion of a microcode program. The result of normalizing the network traffic payload may include a normalized network traffic payload containing substantially normalized data from the network traffic payload. The hardware-based normalization engine may operate on the network traffic payload to normalize the data as the data flows through the hardware-based normalization engine.

The parse engine 238 may include hardware and/or a combination of hardware and programming, but at least hardware to parse the normalized traffic payload. Parsing normalized traffic payloads may include performing a plurality of parsing operations to a normalized traffic payload. The plurality of parsing operations may be split among a plurality of parallel-distributed hardware-based function engines, respectively. Each of the plurality of parallel-distributed hardware-based function engines may be controlled by a portion of a microcode program. A particular hardware-based function engine may perform its parsing operation on a normalized network traffic payload as the network traffic flows through the particular hardware-based function engine and/or the network appliance on which at least a portion of the hardware-based function engine resides. The result of a parsing operation may be captured by a capture collation engine (not illustrated) and organized into a stream of metadata and/or attachments extracted during the parsing operations.

The normalize engine 236 and the parse engine 238 and their hardware-based engine components may communicate with one another via shared communication interfaces. Further, these shared communication interfaces may provide communication with a program control engine 240, capture collation engines (not illustrated), and various other system 230 components. In an example, the hardware-based engine components of the normalize engine 236 and the parse engine 238 may communicate and receive status information (e.g., information regarding the status of a particular normalization operation and/or particular parsing operation) via a common status interface. For example, a hardware-based function engine of the parse engine 238 may provide an indication, communicated through the common status interface, that it needs a different portion of the normalized network traffic payload in order to complete the particular parsing operation of the hardware-based function engine.

The parse engine 236 may include a hardware-based function engine such as a string search engine. The search string engine may include a hardware-based function engine that utilizes hardware such as an FPGA controlled by microcode programming to perform a simultaneous search on a plurality of strings of data. The plurality of strings of data may be provided by, received from, and/or retrieved from a register of another hardware-based function engine of a plurality of parallel-distributed hardware-based function engines. Alternatively or additionally, the plurality of strings of data may be provided by, received from, and/or retrieved from the microcode.

The parse engine 236 may include a hardware-based function engine such as a count function engine. The count function engine may include a hardware-based function engine that utilizes hardware such as an FPGA controlled by microcode programming to discard or capture a portion of bytes based on a microcode instruction. The portion of bytes being discarded and/or captured may be provided by, received from, and/or retrieved from a register of another hardware-based function engine of a plurality of parallel-distributed hardware-based function engines. Alternatively or additionally, the portion of bytes being discarded and/or captured may be provided by, received from, and/or retrieved from the microcode.

The parse engine 236 may include a hardware-based function engine such as an arithmetic function engine. The arithmetic function engine may include a hardware-based function engine that utilizes hardware such as an FPGA controlled by microcode programming to load a plurality of registers associated therewith from microcode and/or from normalized network traffic payload data. The arithmetic function engine may include a hardware-based function engine that utilizes hardware such as an FPGA controlled by microcode programming to perform arithmetic operations among the loaded registers allowing for comparisons among them.

The parse engine 236 may include a hardware-based function engine such as a MIME delimiter function engine. The MIME delimiter function engine may include a hardware-based function engine that utilizes hardware such as an FPGA controlled by microcode programming to capture, into associated registers, the MIME delimiter of the network traffic that has been identified through the overall operation of the parse engine 236.

Additional hardware-based function engines that utilize hardware such as an FPGA controlled by microcode programming to accomplish various functions may be added and/or removed from a plurality of parallel-distributed hardware-based engines existing in the system 230. For example, an additional hardware-based function engine may be added to the plurality of existing parallel-distributed hardware-based function engines without modifying a portion of the microcode associated with the existing hardware-based function engines of the plurality of existing parallel-distributed hardware-based function engines. In another example, a particular hardware-based function engine of the plurality of existing parallel-distributed hardware-based function engines may be removed from the existing plurality of parallel-distributed hardware-based function engines without modifying a portion of the microcode associated with the remaining hardware-based function engines of the existing plurality of parallel-distributed hardware-based function engines. As described above, the modular building-block-like nature of the FPGA and the microcode control allows for the flexibility of the system 230 and the ability to rapidly adapt the system 230 to evolving definitions and preferences of meaningful data without significantly modifying the individual hardware and microcode components of the system 230.

The program control engine 240 may provide a hardware-based function engine with a different portion of microcode. For example, the program control engine 240 may provide the hardware-based function engines with a portion of the microcode identified as a correct next portion of microcode to satisfy a particular execution sequence based on a dynamic status of what is identified in the network traffic packets. For example, the program control engine 240 may, based on the dynamic shared status of what is seen in the packets, direct distinct pieces of microcode to the hardware-based function engines through program "jumps." The program control engine 240 may provide the hardware-based function engine with a different portion of the microcode responsive to an indication communicated through a common status interface. The indication may be an indication from a hardware-based function engine that the different portion of microcode is needed in order to complete the parsing operation associated with the hardware-based function engine.

Figure 3:
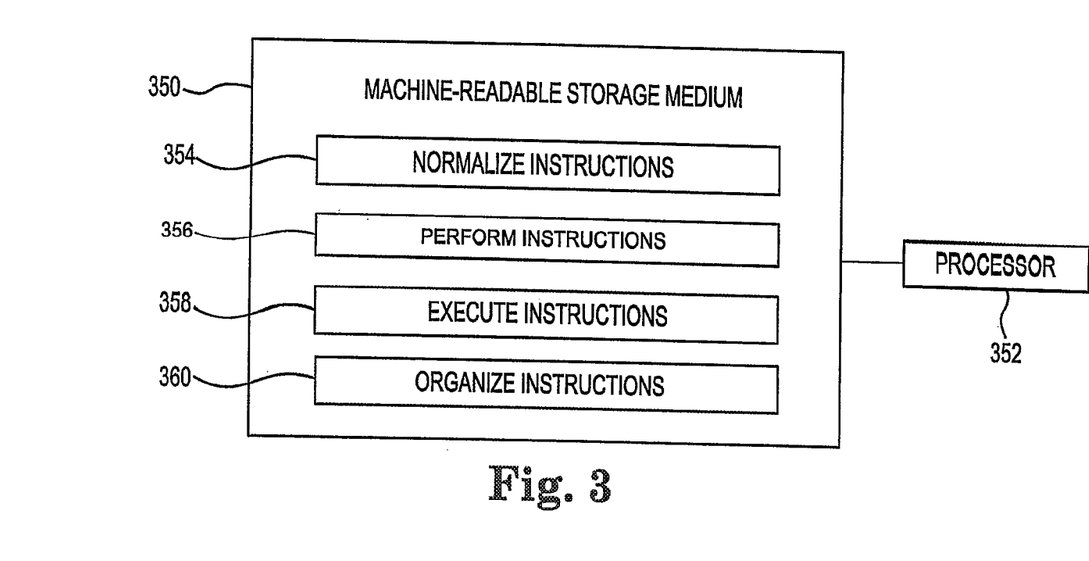
FIG. 3 is a block diagram depicting an example of a machine-readable storage medium comprising instructions executable by a processor for metadata extraction.

FIG. 3 is a block diagram depicting an example machine-readable storage medium 350 comprising instructions executable by a processor 352 for metadata extraction.

In the foregoing discussion, engines 236-240 were described as combinations of hardware and programming. Engines 236-240 may be implemented in a number of fashions. Referring to FIG. 3, the programming may be processor executable instructions 354-360 stored on a machine-readable storage medium 350 and the hardware may include a processor 352 for executing those instructions. Thus, machine-readable storage medium 350 may be said to store program instructions or code that, when executed by processor 352, implements of metadata extraction system 230 of FIG. 2.

In FIG. 3, the executable program instructions in machine-readable storage medium 350 are depicted as normalize instructions 354, perform instructions 356, execute instructions 358, and organize instructions 360. Instructions 354-360 represent program instructions that, when executed, cause processor 352 to implement engines 236, 238, and 240.

Machine-readable storage medium 350 may be any electronic, magnetic, optical, or other physical storage device that contains or stores executable instructions. In some implementations, machine-readable storage medium 350 may be a non-transitory storage medium, where the term "non-transitory" does not encompass transitory propagating signals. Machine-readable storage medium 350 may be implemented in a single device or distributed across devices. Likewise, processor 352 may represent any number of processors capable of executing instructions stored by machine-readable storage medium 350. Processor 352 may be integrated in a single device or distributed across devices. Further, machine-readable storage medium 350 may be fully or partially integrated in the same device as processor 352, or it may be separate but accessible to that device and processor 352.

In one example, the program instructions may be part of an installation package that when installed can be executed by processor 352 to implement privacy preservation system 230. In this case, machine-readable storage medium 350 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 350 may include a hard disk, optical disk, tapes, solid state drives, RAM, ROM, EEPROM, or the like.

Processor 352 may be at least one central processing unit (CPU), microprocessor, and/or other hardware device suitable for retrieval and execution of instructions stored in machine-readable storage medium 350. Processor 352 may fetch, decode, and execute program instructions 354, 356, 358, and 360, and/or other instructions. As an alternative or in addition to retrieving and executing instructions, processor 352 may include at least one electronic circuit comprising a number of electronic components for performing the functionality of at least one of instructions 354, 356, 358, and 360, and/or other instructions.

Normalize instructions 354 may, when executed, cause processor 352 to normalize a network traffic payload. The instructions may include microcode to cause a hardware-based normalization engine to normalize a network traffic payload. The normalize instructions 354 may, when executed, cause processor 352 to normalize the network traffic payload by removing chunk headers and subsequently concatenating meaningful data of an HTTP or a SMTP payload. The normalize instructions 354 may, when executed, cause processor 352 to remove white space from the network traffic payload.

Perform instructions 356 may, when executed, cause processor 352 to perform a plurality of parsing operations on the normalized network traffic payload as the network traffic payload passes through a network. The instructions may include microcode to cause a plurality of parallel-distributed hardware-based function engine to parse a network traffic payload. The perform instructions 356 may, when executed, cause the processor 352 to capture, into a register, a MIME delimiter located through the parse of the normalized network traffic payload. The perform instructions 356 may, when executed, cause the processor 352 to perform an arithmetic operation comparing a plurality of parallel-distributed registers.

Execute instructions 358 may, when executed, cause the processor 352 to execute, through a program control engine, a switch between a first parsing operation and a second parsing operation based on a status of a parsing operation. Each parsing operation may be performed by a separate hardware-based function engine. Each of the hardware-based function engines may communicate status of their respective parsing operation to other hardware-based engines via a shared communication interface. The switch between a first parsing operation of a first hardware-based function engine and a second parsing operation of a second hardware-based function engine may be based on a status shared by, for example, the first hardware-based function engine, indicating an appropriate time for switching between the first and second parsing operations.

Organize instructions 360 may, when executed, cause the processor 352 to organize a plurality of outputs captured from the plurality of parsing operations. Organizing may include capturing and collating the outputs from the hardware-based function engines into a stream of captured metadata and/or attachments. Organizing may include formatting the captured outputs for further analysis and/or for presentation for a user.

Figure 4:
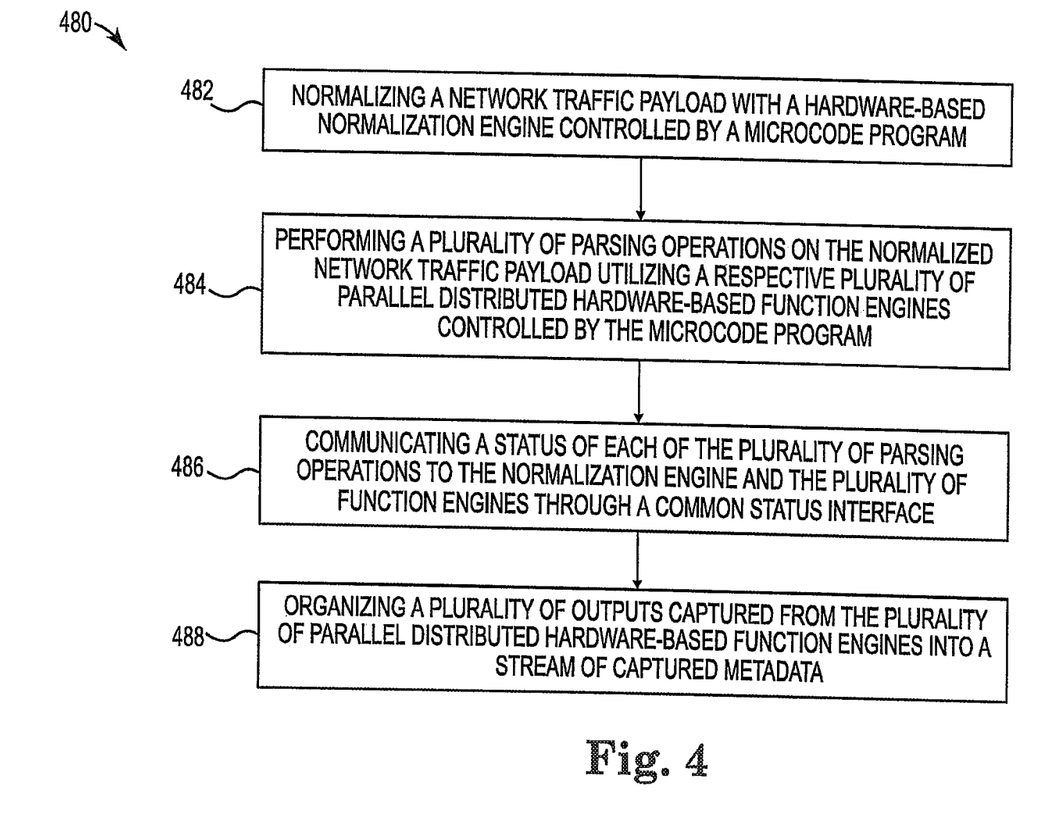
FIG. 4 is a flow diagram depicting an example of a method for metadata extraction.

FIG. 4 is a flow diagram depicting an example method for metadata extraction. The various processing blocks and/or data flows depicted in FIG. 4 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 480 as illustrated (and described in greater detail below) is meant to be an example and, as such, should not be viewed as limiting. Method 480 may be implemented in the form of executable instructions stored on a machine-readable storage medium (e.g., machine-readable storage medium 350, previously described in connection with FIG. 3), and/or in the form of electronic circuitry.

As illustrated at 482, the method 480 may include normalizing a network traffic payload with a hardware-based normalization engine controlled by a microcode program. Normalizing the network traffic payload may include normalizing the network traffic payload as it passes through a network. For example, the network traffic payload may be normalized as it passes through a hardware-based normalization engine and/or the appliance the hardware-based normalization engine is located on. The network traffic payload may be a level five and/or higher payload of a network packet extracted from network traffic as it passes through the hardware-based normalization engine.

As illustrated at 484, the method 480 may include performing a plurality of parsing operations on the normalized network traffic payload utilizing a respective plurality of parallel-distributed hardware-based function engines controlled by the microcode program. Performing the plurality of parsing operations on the normalized network traffic payload may include sequentially performing the plurality of parsing operations by switching among the respective plurality of parallel-distributed hardware-based function engines according to a sequence of the microcode program. Alternatively, performing the plurality of parsing operations on the normalized network traffic payload may include performing the plurality of parsing operations concurrently.

As illustrated at 486, the method 480 may include communicating a status of each of the plurality of parsing operations to the normalization engine and the plurality of function engines through a common status interface. The normalization engines and/or the function engines may generate a flag as part of its shared status communicated through the shared status interface. The flag may serve as an indication to a program control engine as to the appropriate switches and/or switch timing to execute between the hardware-based engines.

As illustrated at 488, the method 480 may include organizing a plurality of outputs captured from the plurality of parallel-distributed hardware-based function engines into a stream of captured metadata and/or attachments. The metadata and/or attachments may be limited to data defined as meaningful or as having meaningful attributes as a user. A user may utilize the stream of metadata and/or attachments to rapidly assess and/or modify data that can be targeted as meaningful going forward without significantly modifying hardware and/or microcode.

The foregoing disclosure describes a number of example implementations for metadata extraction. The disclosed examples may include systems, devices, machine-readable storage media, and methods for metadata extraction. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIG. 4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

What is claimed is:

1. A system for extraction of metadata of network traffic of a computer network, the system comprising:
   a normalization engine that is configured to normalize a level five and higher payload of the network traffic, as the network traffic passes through the computer network, to generate a normalized network traffic payload;
   a plurality of parallel-distributed hardware-based function engines that each comprises a programmable hardware processor controlled by a microcode program, the plurality of parallel-distributed hardware-based function engines being configured to perform a plurality of parsing operations on the normalized network traffic payload to generate captured outputs;
   a program control engine that is configured to provide the plurality of parallel-distributed hardware-based function engines with portions of the microcode program; and
   a capture collation engine that is configured to accept the captured outputs from the plurality of parallel-distributed hardware-based function engines and to generate, based on the captured outputs, the metadata of the network traffic for a security function of the computer network.

2. The system of claim 1, wherein the plurality of parallel-distributed hardware-based function engines includes a multipurpose internet mail extensions (MIME) function engine that is configured to capture a MIME delimeter of the normalized network traffic payload.

3. The system of claim 1, wherein the plurality of parallel-distributed hardware-based function engines includes a hardware-based string search engine that is configured to perform a search on a plurality of strings of data.

4. The system of claim 3, wherein the plurality of strings of data is received from a register of another hardware-based function engine of the plurality of parallel-distributed hardware-based function engines.

5. The system of claim 1, wherein the plurality of parallel-distributed hardware-based function engines includes a hardware-based arithmetic function engine that is configured to perform arithmetic operations.

6. The system of claim 1, wherein the plurality of parallel-distributed hardware-based function engines includes a hardware-based count function engine that is configured to discard or capture a portion of bytes of data.

7. The system of claim 6, wherein the portion of bytes of data is from a register of another hardware-based function engine of the plurality of parallel-distributed hardware-based function engines.

8. The system of claim 1, wherein the program control engine is configured to provide respective ones of the plurality of parallel-distributed hardware-based function engines with a distinct portion of the microcode program identified as a correct next portion of the microcode program to satisfy a particular execution sequence.

9. The system of claim 1, wherein the normalization engine is configured to de-chunk the level five and higher payload of the network traffic.

10. The system of claim 1, wherein the normalization engine is configured to remove white spaces from the level five and higher payload of the network traffic.

11. A method of extraction of metadata of network traffic on a computer network, the method comprising:

extracting a level five and higher network traffic payload of the network traffic as the network traffic passes through the computer network;

normalizing the level five and higher network traffic payload of the network traffic to generate a normalized network traffic payload;

parsing the normalized network traffic payload utilizing a plurality of parallel-distributed hardware-based function engines;

collating a plurality of outputs captured from the plurality of parallel-distributed hardware-based function engines;

generating, from the collated plurality of outputs captured from the plurality of parallel-distributed hardware-based function engines, the metadata of the network traffic for a security function of the computer network; and controlling parsing operations of the plurality of parallel-distributed hardware-based function engines with a microcode program.

12. The method of claim 11, further comprising:

capturing, by a first hardware-based function engine of the plurality of parallel-distributed hardware-based function engines, a MIME delimeter of the normalized network traffic payload.

13. The method of claim 11, further comprising:

searching, by a second hardware-based function engine of the plurality of parallel-distributed hardware-based function engines, a plurality of strings of data.

14. The method of claim 13, further comprising:

receiving the plurality of strings of data from a register of a third hardware-based function engine of the plurality of parallel-distributed hardware-based function engines.

15. The method of claim 11, further comprising:

discarding or capturing, by a fourth hardware-based function engine of the plurality of parallel-distributed hardware-based function engines, a portion of bytes that are received from a register of a fifth hardware-based function engine of the plurality of parallel-distributed hardware-based function engines.

16. The method of claim 11, further comprising:

providing the plurality of parallel-distributed hardware-based function engines with a distinct portion of the microcode program identified as a correct next portion of the microcode program to satisfy a particular execution sequence.

17. The method of claim 11, wherein normalizing the level five and higher network traffic payload includes de-chunking the level five and higher network traffic payload.

18. The method of claim 11, wherein normalizing the level five and higher network traffic payload includes removing white spaces from the level five and higher network traffic payload.

* * * * *